United States Patent [19]
Watanabe

[11] Patent Number: 5,465,918
[45] Date of Patent: Nov. 14, 1995

[54] CURRENT SUPPLY CIRCUIT AND CONTROL METHOD FOR SUPPLY CURRENT IN A MAGNETIC TAPE APPARATUS

[75] Inventor: Shuko Watanabe, Kawasaki, Japan

[73] Assignee: Fujitsu Limited, Kawasaki, Japan

[21] Appl. No.: 317,845

[22] Filed: Oct. 4, 1994

Related U.S. Application Data

[63] Continuation of Ser. No. 927,613, Aug. 10, 1992, abandoned.

[30] Foreign Application Priority Data

Aug. 13, 1991 [JP] Japan ...................... 3-202910

[51] Int. Cl.$^6$ ............................................. G11B 15/43
[52] U.S. Cl. ........................... 242/334.2; 242/334.5
[58] Field of Search ....................... 242/179, 186, 242/189, 201, 75.45, 334, 334.2, 334.5; 360/74.2; 318/6, 7

[56] References Cited

U.S. PATENT DOCUMENTS

| | | | |
|---|---|---|---|
| 4,015,799 | 4/1977 | Koski et al. | 318/7 |
| 4,125,881 | 11/1978 | Eige et al. | 242/186 X |
| 4,256,996 | 3/1981 | Brooks et al. | 242/186 X |
| 4,398,227 | 8/1983 | Anderson | 360/71 |
| 4,531,166 | 7/1985 | Anderson | 242/186 X |
| 4,628,375 | 12/1986 | Stadlmann | 360/71 |
| 4,664,336 | 5/1987 | Koyama | 242/186 |
| 4,777,413 | 10/1988 | Yoshimura et al. | 318/7 |
| 4,788,606 | 11/1988 | Uchikoshi | 242/186 X |
| 4,977,466 | 12/1990 | Nakata | 242/186 X |
| 4,993,660 | 2/1991 | Harigaya et al. | 242/186 |
| 5,012,989 | 5/1991 | Whyte, Jr. et al. | 242/186 |
| 5,222,684 | 6/1993 | Yoneda et al. | 242/186 |

FOREIGN PATENT DOCUMENTS

| | | |
|---|---|---|
| 3818360 | 12/1988 | Germany . |
| 58-98866 | 6/1983 | Japan . |
| 283842 | 3/1990 | Japan . |
| 283845 | 3/1990 | Japan . |

OTHER PUBLICATIONS

Patent Abstract of Japanese Publication No. 62-150546. Dec. 1987.
Patent Abstract of Japanese Publication No. 2-094153. Jun. 1990.
Patent Abstract of Japanese Publication No. 58-158068. Dec. 1983.

Primary Examiner—John P. Darling
Attorney, Agent, or Firm—Greer, Burns & Crain, Ltd.

[57] ABSTRACT

In a current supply circuit for supplying a current to a reel-drive motor in a magnetic tape apparatus, the circuit includes: a conversion table storing a relationship between a radius of the magnetic tape wound on a reel and a target current to be supplied to the reel-drive motor, and the target current being converted to a digital command; a correction table storing a relationship between the digital command and an actual current flowing in the motor when the digital command is applied to the motor, the actual current being converted to a digital value; a command unit for outputting the digital command corresponding to the target current in accordance with the conversion table; a supply current control unit for supplying an analog current corresponding to the digital command to the motor; a first correction unit for applying first correction signal to the supply current control unit in response to the actual current flowing in the motor; and a second correction unit for supplying a second correction signal to the supply current control unit in accordance with an error to be corrected from the correction table with reference to the digital command.

12 Claims, 9 Drawing Sheets

Fig.7

| COMMAND VALUE (TARGET VALUE) | ACTUAL VALUE (ADC) | COMMAND VALUE MINUS ADC (ERROR) |
|---|---|---|
| $\alpha$ | ADC(1) | $\alpha$ - ADC(1) |
| $2\alpha$ | ADC(2) | $2\alpha$ - ADC(2) |
| $3\alpha$ | ADC(3) | $3\alpha$ - ADC(3) |
| $4\alpha$ | ADC(4) | $4\alpha$ - ADC(4) |
| $5\alpha$ | ADC(5) | $5\alpha$ - ADC(5) |
| $6\alpha$ | ADC(6) | $6\alpha$ - ADC(6) |
| $7\alpha$ | ADC(7) | $7\alpha$ - ADC(7) |
| $8\alpha$ | ADC(8) | $8\alpha$ - ADC(8) |
| $9\alpha$ | ADC(9) | $9\alpha$ - ADC(9) |
| $10\alpha$ | ADC(10) | $10\alpha$ - ADC(10) |

Fig. 8

| RADIUS R (cm) | INERTIA CURRENT Ia | TAPE TENSION CURRENT IT | FRICTION CURRENT Ia | SUPPLY CURRENT Im | DIGITAL COMMAND (Im/0.05) |
|---|---|---|---|---|---|
| 2.5 | 2 A | 0.56 A | 0.3 A | 2.86 A | 57 |
| --- | | | | | |
| 3.0 | 2.5 A | 0.67 A | 0.3 A | 3.47 A | 69 |
| --- | | | | | |
| 4.0 | 3 A | 0.9 A | 0.3 A | 4.2 A | 84 |

CURRENT SUPPLY CIRCUIT AND CONTROL METHOD FOR SUPPLY CURRENT IN A MAGNETIC TAPE APPARATUS

RELATED APPLICATION

This is a continuation of application Ser. No. 07/927,613, filed on Aug. 10, 1992, now abandoned.

BACKGROUND OF THE INVENTION

1. Field of the Invention

The present invention relates to a current supply circuit and a control method for a supply current to a reel-drive motor in a magnetic apparatus.

2. Description of the Related Art

There is known a magnetic tape apparatus of a type that a magnetic tape is transferred from a supply reel to a take-up reel through a magnetic head, such that tape tension in the vicinity of the magnetic head is maintained at a constant value without a mechanical tape buffer which applies mechanical tension to the magnetic tape.

In such a magnetic tape apparatus, in order to transfer the magnetic tape from the supply reel to the take-up reel at a constant tape tension and a constant tape speed, the reel-drive motor must be controlled under a torque corrected by various parameters, for example, a reference torque, a difference torque caused by a change in the radius of a magnetic tape wound on the reel (below, a radius of a tape), a friction torque caused by the reel, and an inertial moment caused by the rotation of the reel.

A current supply circuit is provided for supplying the current to the reel-drive motor in accordance with a command that is generated in response to the radius of the tape and the actual tape speed so that it is possible to apply the corrected torque to the reel-drive motor.

SUMMARY OF THE INVENTION

The object of the present invention is to provide a current supply circuit and a control method enabling a constant supply current to a reel drive motor in precise response to a command from a command unit without a mechanical tension sensor and regardless of the dispersion of a value of electrical elements, particularly, resistor in the current supply circuit.

In accordance with one aspect of the present invention, there is provided a current supply circuit for supplying a current to a reel-drive motor in a magnetic tape apparatus, including:

a conversion table storing a relationship between a radius of the magnetic tape wound on a reel and a target current to be supplied to the reel-drive motor, and the target current being converted to a digital command;

a correction table storing a relationship between the digital command and an actual current flowing in the motor when the digital command is applied to the motor, the actual current being converted to a digital value;

a command unit for outputting the digital command corresponding to the target current in accordance with the conversion table;

a supply current control unit for supplying an analog current corresponding to the digital command to the motor;

a first correction unit for applying a first correction signal to the supply current control unit in response to the actual current flowing in the motor; and a second correction unit for supplying a second correction signal to the supply current control unit in accordance with an error to be corrected from the correction table with reference to the digital command.

In one preferred embodiment, the supply current control unit has an operational amplifier of which a non-inverted terminal (+) is connected to a ground and an inverted terminal (−) is connected to a first resistor and a second resistor, the first correction signal being input to the inverted terminal through the first resistor, and an output of the command unit being connected to the inverted terminal through the second resistor.

In another preferred embodiment, the supply current control means further comprises two filters connected to the first resistor through a switch unit which switches between two filters, one filter being a low-pass filter for a speed control provided to cut-off over predetermined frequency, and the other filter being a differential filter for position control provided to detect the tape run/stop state.

In another aspect of the present invention, there is provided a control method for a supply current to a reel-drive motor in a magnetic tape apparatus, the method including:

previously providing a conversion table storing a relationship between a radius of the magnetic tape wound on a reel and a target current to be supplied to the reel-drive motor, and the target current being converted to a digital command;

providing a correction table storing a relationship between the digital command and an actual current flowing the motor when the digital command is applied to the motor, the actual current being converted to a digital value;

outputting the digital command corresponding to the target current from a command unit in accordance with the conversion table;

supplying an analog current corresponding to the digital command from a supply current control unit to the motor;

applying a first correction signal from a first correction unit to the supply current control unit in response to the actual current flowing in the motor; and supplying a second correction signal from a second correction unit to the supply current control unit in accordance with an error to be corrected from the correction table with reference to the digital command.

BRIEF DESCRIPTION OF THE DRAWINGS

In the drawings:

FIG. 7 shows a correction table according to the present invention;

FIG. 8 shows one example of a conversion table between a radius of a tape and a supply current to a motor according to the present invention.

DESCRIPTION OF THE PREFERRED EMBODIMENTS

Before describing the preferred embodiments, a conventional current supply circuit in a magnetic tape apparatus and its problems will be explained in detail below.

Figure 1:
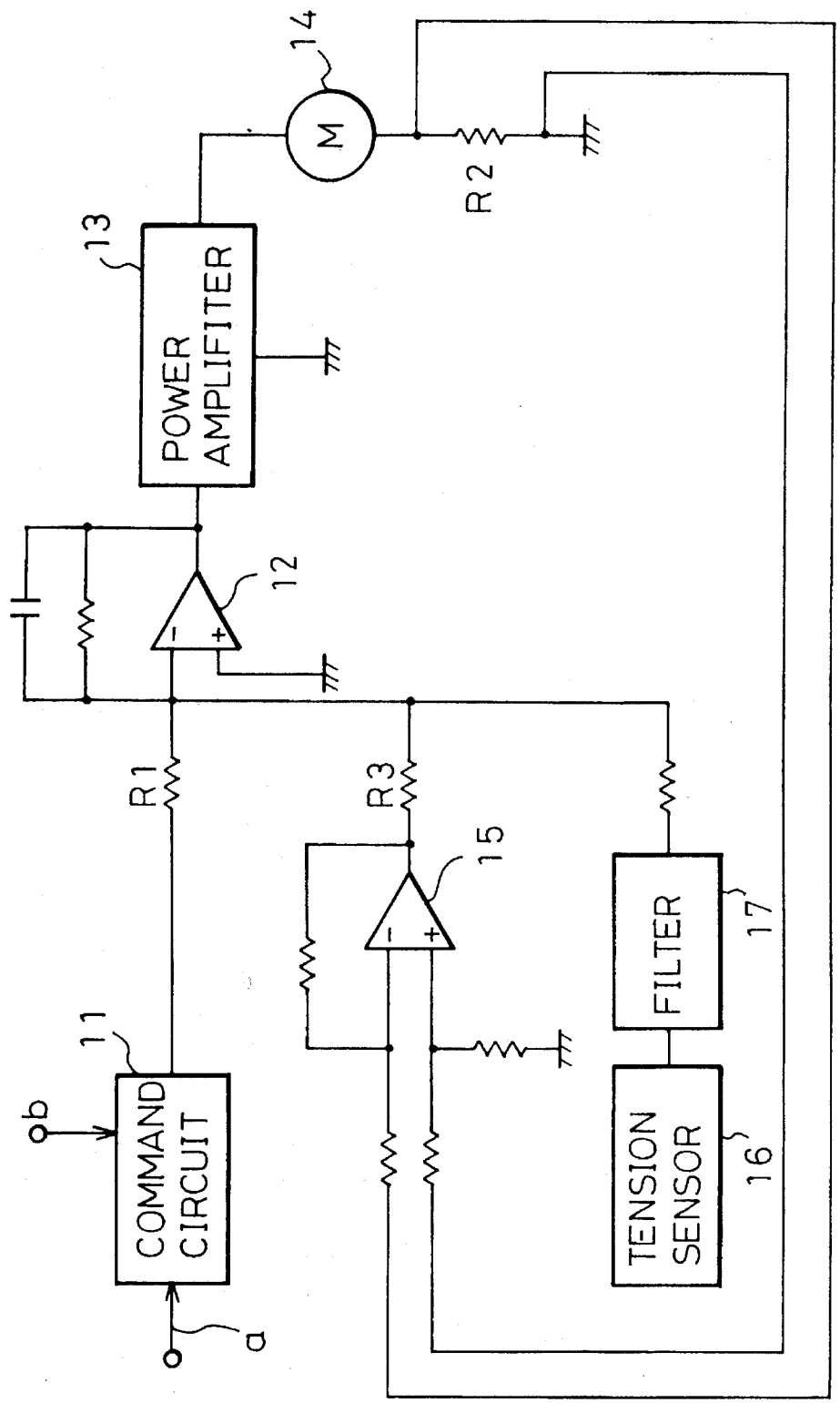
FIG. 1 shows a conventional current supply circuit in a magnetic tape apparatus.

FIG. 1 shows a conventional current supply circuit in a magnetic tape apparatus. In FIG. 1, reference number 11 denotes a command circuit, 12 an operational amplifier, 13 a power amplifier, 14 a motor, 15 a differential amplifier, 16 a tension sensor, and 17 a filter. A command "a" indicating tape speed and a value "b" indicating the radius of the tape are input to the command circuit 11. The value "b" is detected by a tachometer (not shown) which is structurally coupled to the shaft of the reel-drive motor 14. Based on these values "a" and "b", the command circuit 11 supplies the voltage to the inverted terminal (−) of the operational amplifier 12. This voltage corresponds to the current to be supplied to the reel-drive motor 14. The non-inverted terminal (+) of the operational amplifier 12 is connected to the ground, and the output of the operational amplifier 12 is connected to the power amplifier 13 used as a constant current generating circuit. The output of the power amplifier 13 is supplied to the motor 14, and the resistor R2 is connected between the motor 14 and the ground.

The amount of the current supplied to the motor 14 is detected by the voltage across the resistor R2, and the detected voltage is supplied to the differential amplifier 15. The output of the differential amplifier 15 is supplied to the inverted terminal of the operational amplifier 12 through the resistor R3. Further, the output of the tension sensor 16 is supplied to the inverted terminal of the operational amplifier 12 through the filter 17.

Assuming that, first, a current of 50 mA is supplied to the motor 14 for every output voltage of 10 mV from the command circuit 11, second, the feed-back resistor R2 is 0.1Ω, third, the amplification degree of the differential amplifier 15 is minus two times (−2 times), finally, the value of the resistor R1 is equal to that of the resistor R3, the voltage of the resistor R1 is equal to that of the resistor R3, the voltage of the resistor R1 is equal to that of the resistor R3 in an absolute value but opposite in sign so that "0" volt is always supplied to the inverted terminal of the operational amplifier 12.

That is, since the voltage across the resistor R2 becomes 5 mV (50 mA×0.1Ω) so that the output of the differential amplifier 15 becomes −10 mV, the inverted terminal of the operational amplifier 12 becomes 0 V when the absolute value of the resistor R1 is equal to that of the resistor R3.

In this case, for example, when the current of 48 mA (note, it is not 50 mA) is supplied to the motor 14 when the output voltage of the command circuit 11 is 10 mV, the voltage across the resistor R2 becomes 4.8 mV so that the output voltage of the differential amplifier 15 becomes −9.6 mV.

That is, since the input voltage of the resistor R1 is 10 mV (i.e., the output voltage of the command circuit 11) and the input voltage of the resistor R3 (i.e., the output voltage of the differential amplifier 15) is −9.6 mV, the voltage of 0.4 mV is input to the inverted terminal of the operational amplifier 12 when the absolute value of the resistor R1 is equal to that of the resistor R3. Accordingly, the increased current corresponding to the voltage of 0.4 mV is applied from the power amplifier 13 to the motor 14 so that the increased voltage across the resistor R2 is fed-back to the differential amplifier 15 and the absolute value of the output voltage of the command circuit 11 is coincided with that of the differential amplifier 15.

As a result of the above feed-back control, since the absolute value of the output voltage of the command circuit 11 coincides with that of the differential amplifier 15, the voltage of the inverted terminal of the operational amplifier 12 again becomes the voltage 0 V so that the increment of the current from the power amplifier 13 is stopped. As a result, the constant current precisely corresponding to the output of the command circuit 11 is supplied to the motor 14.

There are, however, problems in the above conventional circuit. That is, for resistors R1 to R3, there is large dispersion of value caused by the manufacturing process, and there is large fluctuation of value caused by change of the temperature. Accordingly, the current corresponding to the output of the command circuit is not precisely supplied to the motor so that it is very difficult to obtain precise control of the supply current to the motor in the conventional current supply circuit.

As one countermeasure of the above problem, the resistors R1 to R3 each having small dispersion value are provided for obtaining precise control of the supply current. There is, however, a fluctuation of about 6% in the supply current as a minimum value even if high grade resistors are used. As a result, the drive torque of the motor fluctuates, and the tape tension also fluctuates.

As another countermeasure of the above problem, the mechanical tension sensor 16 is provided on the magnetic tape path for detecting the tape tension, and the output current from the power amplifier 13 is corrected in accordance with a change in the tape tension. However, the structure of the mechanical tension sensor is relatively large so that it is not advantageous to miniaturize the magnetic tape apparatus.

Accordingly, the object of the present invention is to provide a current supply circuit and a control method enabling a constant supply current to a reel-drive motor in precise response to the output of the command circuit without a tension sensor and regardless of the dispersion value of the resistors.

Figure 2:
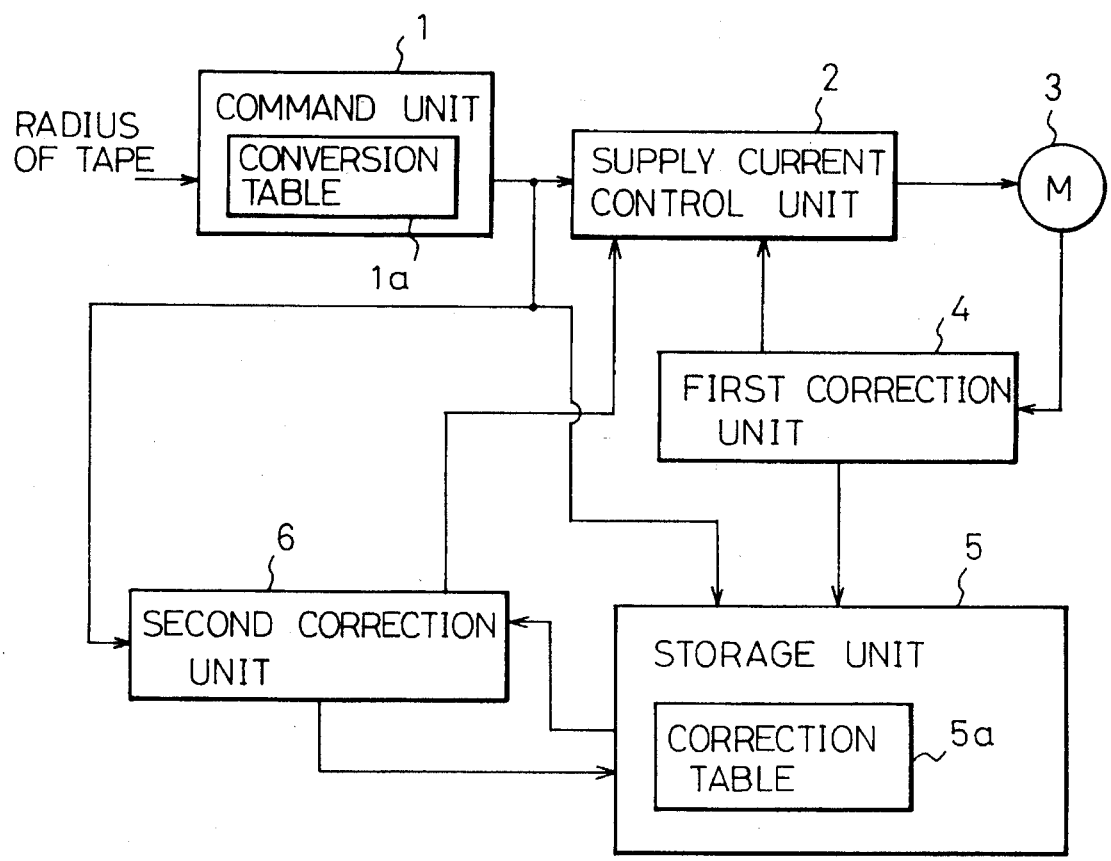
FIG. 2 is a basic block diagram of a current supply circuit in a magnetic tape apparatus according to the present invention.

FIG. 2 is a basic structure of a current supply circuit according to the present invention. In FIG. 2, two reel-motors (M) 3 are provided to the supply reel and the take-up reel. The current supply circuit comprises a command unit 1 for outputting a digital command based on a conversion table 1a which obtains a target current to be supplied to the reel-drive motor 3 from the radius of the tape, a supply current control unit 2 for supplying the current to the reel-drive motor 3 in accordance with the command from the command unit 1, and a first correction unit 4 for supplying a first correction signal to the supply current control unit 2 in accordance with an actual current flowing in the reel drive motor 3.

Further, the current supply circuit comprises a storage unit 5 for storing a correction table 5a formed by the voltage of a predetermined position in the first correction unit 4 and the correction value corresponding to the difference between the actual current and the target current, and a second correction unit 6 for supplying a second correction signal to the supply current control unit 2 in accordance with the correction value obtained from the correction table 5a based on the command of the command unit 1.

Further, in the above magnetic tape apparatus, a control method for supplying current to the motor is as follows:

outputting a command corresponding to a target current to be supplied to the reel drive motor 3, supplying the current from the supply current control unit 2 to the reel drive motor 3 in accordance with the command, supplying the first correction signal from the first correction unit 4 to the supply current control unit 2 in accordance with the actual current flowing in the reel drive motor 3, storing a correction table 5a formed by the voltage of a predetermined position in the first correction unit 4 and the correction value corresponding to the difference between the actual current and the target current, and supplying a second correction signal to the supply current control unit 2 in accordance with the correction value obtained from the correction table 5a based on the command of the command unit 1.

In the present invention, the conversion table is previously prepared based on the relationship between the radius of the tape and the supply current to the motor. Further, the correction table is also previously prepared based on the voltage of a predetermined position in the first correction unit 4 and the correction value corresponding to the difference between the actual current and the target current. The correction value obtained from the correction table 5a is based on the command of the command unit 1, and the second correction signal is supplied to the supply current control unit 2 in accordance with the above correction value.

Figure 3:
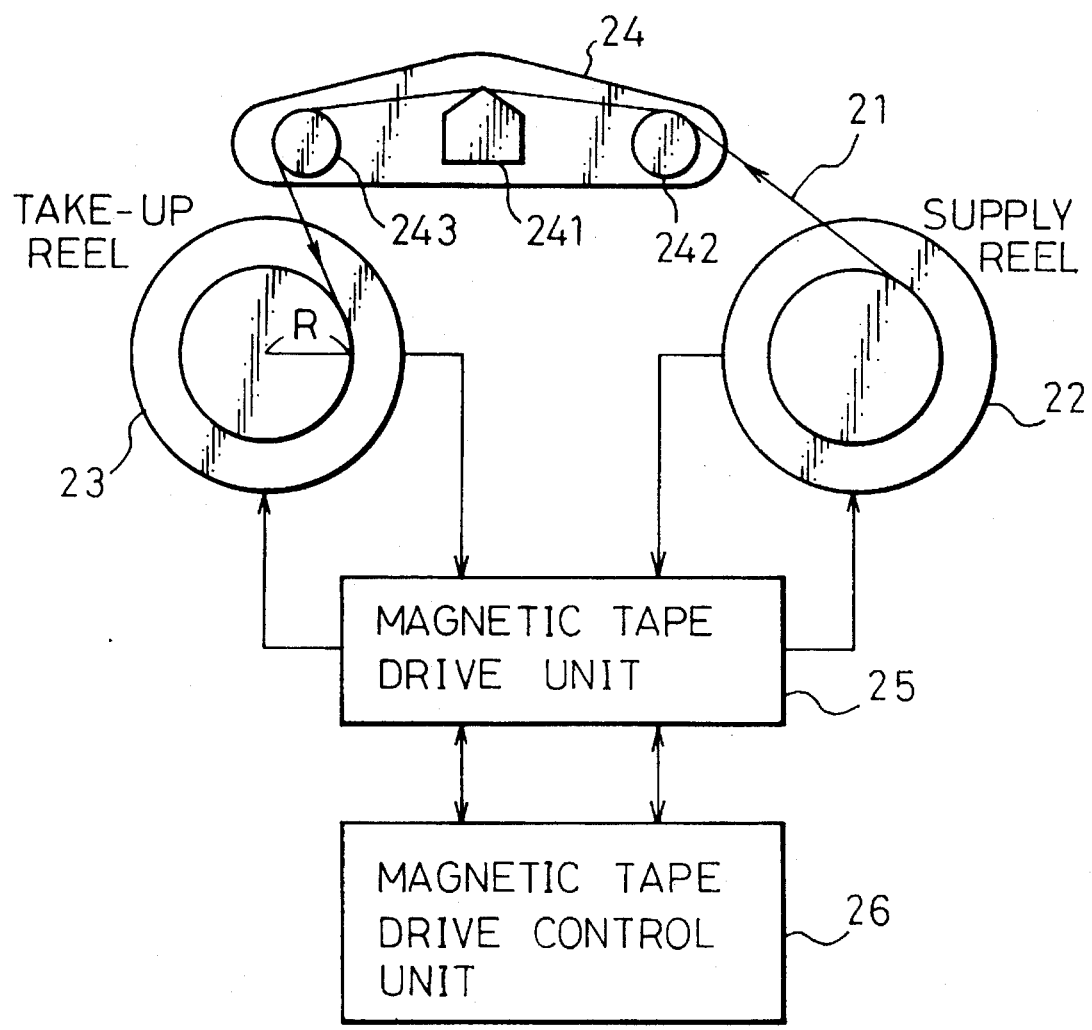
FIG. 3 is a schematic block diagram of a magnetic 10 tape apparatus such that a magnetic tape is transferred from a supply reel to a take-up reel through a magnetic head without a mechanical tape buffer.

FIG. 3 is a schematic block diagram of a magnetic tape apparatus such that a magnetic tape is transferred from the supply reel to the take-up reel through a magnetic head without a mechanical tape buffer. In the drawing, reference number 21 denotes a magnetic tape, 22 denotes a supply reel, 23 denotes a take-up reel, and 24 denotes a head guide having a magnetic head 241 and roller guides 242 and 243. The reel drive motor 3 (FIG. 2) is independently provided to the supply motor 22 and the take-up motor 23. The magnetic tape 21 is transferred from the supply reel 21 to the take-up reel 23 through the head guide 24. Further, "R" is the radius of the tape wound on the take-up reel 23.

Further, a magnetic tape drive unit 25 and a magnetic tape drive control unit 26 are provided as drive and control units. The current supply circuit according to the present invention is included in the magnetic tape drive control unit 26.

As is obvious from the drawing, there are no tape buffers or mechanical tape tension sensors for adjusting the tape tension in the present invention. In the present invention, the tape tension in the vicinity of the magnetic head 241 is maintained at a constant value without the tape buffer, and controlled by the torque of the reel-drive motor 3 so as to maintain a constant tape tension and a constant tape speed.

Figure 4:
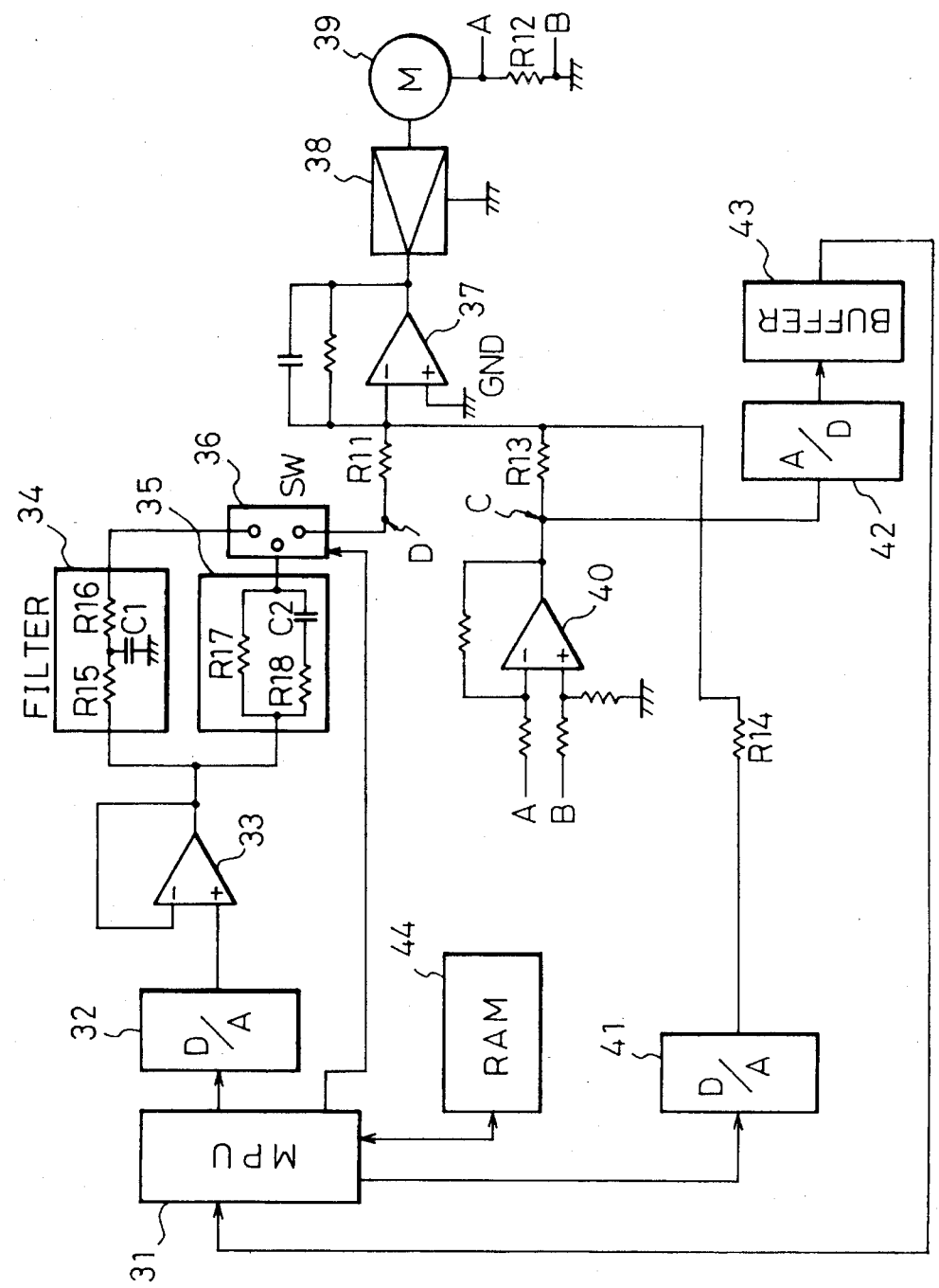
FIG. 4 is a circuit diagram of a current supply circuit according to an embodiment of the present invention.

FIG. 4 is a circuit diagram of a current supply circuit according to an embodiment of the present invention. In the drawing, reference number 31 denotes a microprocessor (MPU), 32 a digital-to-analog (D/A) convertor, 33 an operational amplifier, 34 a speed control filter, 35 a position control filter, 37 an operational amplifier, 38 a power amplifier, 39 a motor, a differential amplifier, 41 a digital-to-analog (D/A) convertor, 42 an analog-to-digital convertor, 43 a buffer, and 44 a RAM.

Figure 9:
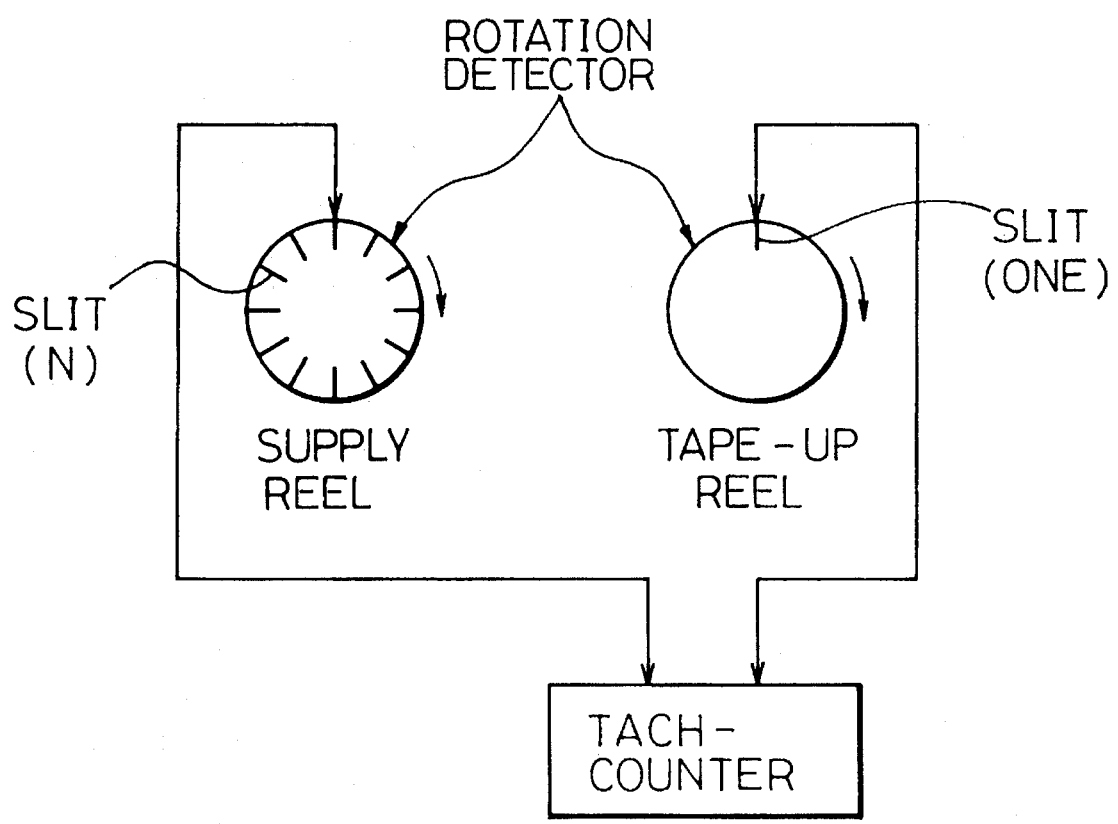
FIG. 9 is a view explaining the rotation of the supply reel and the take-up reel.

The reel-drive motor 39 has a tachcounter for counting the rotation of the reel as shown in FIG. 9, and the radius of the tape on the reel is detected based on the values counted by the tachcounter. That is, as shown in FIG. 9, the rotation detector is provided for each motor shaft (not-shown) of the supply reel and the take-up reel. The rotation detector of the supply reel has N-pieces slits, and that of the take-up reel has only one slit. Accordingly, the number of the slit, i.e., the rotation speed of the reel can be counted by the tachcounter.

How to obtain the radius of the tape is explained below. That is, the relationship between the radius of the tape and the number of the slit is expressed as follows.

$$R_M/R_F = N_F/N \quad (1)$$

Where, $R_M$ is the radius of the tape of the supply reel, $R_F$ is the radius of the tape of the take-up reel, N is the number of slits, and $N_F$ is the number of the pulse of the supply reel during one rotation of the take-up reel.

Accordingly, the following formula is obtained based on the above formula (1).

$$w(\pi R_0^2 - \pi R_i^2) = w(\pi R_F^2 - \pi R_i^2) + w(\pi R_F^2 - \pi R_i^2) \quad (2)$$

Where, $R_i$ is the radius of the hab (i.e., empty reel), $R_0$ is the radius of the fully wound tape, and w is the tape width.

The formula (2) can be replaced as follows.

$$R_F = C/\sqrt{1 + (N_F/N)^2} \quad (3)$$

$$R_M = C/\sqrt{1 + (N/N_F)^2} \quad (4)$$

Where, $C$ is $\sqrt{R_0^2 + R_i^2}$

Accordingly, it is possible to obtain the radius of the tape based on the formula (3) and (4).

When the radius of the tape is input to the microprocessor 31, the microprocessor 31 (for example, bits processor) determines the current to be supplied to motor 39 based on a conversion table shown in FIG. 8, and outputs a digital command (see, following formula) to the D/A convertor 32. This digital command is obtained by the digital value selected from the digital values having 8 bits-256 steps in accordance with the above current as explained in detail below. In the case, one step in 256 steps corresponds to 50 mA of the supply current to the motor 39. The conversion table is stored in the RAM 44.

As shown in FIG. 8, the conversion table having a relationship between the radius R of the tape and the supply current $I_m$ to the motor is previously stored in the storage unit, because the inertial moment of the empty reel, the motor and the wound tape mainly depends on the radius of the tape so that the current to be supplied to the motor can be determined based on the following formula.

$$I_m = I_a + I_T + I_d \quad (5)$$

Where, $I_m$ is the supply current to the motor,
$I_a$ is the current caused by the inertia,
$I_T$ is the current caused by the tape tension, and
$I_d$ is the current caused by the friction.
The formula (5) can be replaced as follows.

$$I_m = (C_1(R_i^4 - C_2)/R + J_E/R + J_M/R)A/K_T + FR/K_T + (T_v + T_c)/K_T \quad (6)$$

Where,

A is an acceleretion speed (cm/sec$^2$), $K_T$ is a torque constant of the motor (kg cm/A), $C_1$ is the value of $\pi \rho w/2$, i.e., inertia constant, $C_2$ is $R_i^4$, i.e., inertia contant, $\rho$ is a tape density (g/cm$^3$), w is the tape width (cm), $J_E$ is the inertia of the empty reel (g cm$^2$), $J_M$ is the inertia of the motor (g cm$^2$), F is the tape tension (g), R is the radius of the tape (cm), $T_v$ is the friction torque for the viscosity (kg cm), and, $T_c$ is the friction torque for the viscosity (kg cm).

As explained above, one step in 256 steps corresponds to the supply current of 50 mA to the motor, the digital value (below, digital command) to the D/A convertor 32 is obtained as follows.

$$\text{digital command} = I_m/0.05 \quad (7)$$

Accordingly, when the supply current to the motor is determined from the radius of the tape based on the conversion table shown in FIG. 8, the digital command to the D/A convertor 32 can be obtained by the formula (7), and this digital value is input to the D/A convertor 32.

Further, the D/A convertor 32 converts the digital command (digital command value) into the analog command (MDAC), and this analog command is input to the speed control filter 34 and the position control filter 35 through the operational amplifier 33. The speed control filter 34 is a low-pass filter formed by two resistor R15, R16 and a condenser C1. This filter 34 is provided to cut-off the frequency over 200 Hz. That is, the speed control filter 34 is necessary to prevent vibration in the vicinity of 1 KHz caused by the twist resonance of the shaft between the reel and the motor during the tape transfer.

The position control filter 35 is a differential filter formed by the resistor R17, R18 and the condenser C2. The resistor 18 is connected in series to the condenser C2, and these are connected in parallel to the resistor R17. The position control filter 35 outputs the differential value corresponding to the difference value between the target rotational speed and the actual rotation speed of the motor, and is provided for detecting the tape run/stop state.

The output of these filters 34 and 35 are input to the switch 36. The connection of the switch 36 is controlled by the microprocessor 31. Accordingly, the output of the speed control filter 34 is supplied to the resistor R11 in the tape run state, and the output of the position control filter 35 is supplied to the resistor R11 in the tape stop state. In the tape run state, the voltage of 10 mV is supplied to the resistor R11 (at the point D) from the speed control filter 34, and this voltage corresponds to one step of the digital command from the microprocessor 31. This voltage of 10 mV is supplied to the inverted terminal of the operational amplifier 37 through the resistor R11. The non-inverted terminal of the operational amplifier 37 is connected to the ground, and the output of the operational amplifier 37 is connected to the power amplifier 38 which functions as a constant current generating circuit. The output of the power amplifier 38 is supplied to the series circuit formed by the motor and the resistor R12. The current supplied to the motor 39 is detected by the voltage across the resistor R12 (A–B), and this voltage is supplied to the differential amplifier 40. The output of the differential amplifier 40 is supplied to the inverted terminal of the operational amplifier 37.

As is obvious from a comparison with FIG. 1, the operational amplifier 37, the power amplifier 38, the motor 39 and the differential amplifier 40 are the same components 12 to 15 in FIG. 1. Accordingly, the detailed structure is omitted.

As explained above, when, first, the value of the resistor R11 is equal to the value of the resistor R13, second, the value of the resistor R12 is 0.1Ω, and third, the amplification rate of the differential amplifier 40 is minus two times, the output voltage of differential amplifier 40 (i.e., input voltage of resistor R13, see, point C) is equal to the input voltage of the resistor R11 (see, point D) in the absolute value but opposite in sign.

As explained in FIG. 1, however, there is dispersion value of elements, for example, resistor R11, R12 and R13 so that the voltage at point C does not always coincide with the voltage at the point D in the absolute value.

Accordingly, the present invention solves this dispersion of the elements as follows. The voltage at the point C is converted into the digital value by the A/D convertor 42, and this digital value is input to the microprocessor 31 through the buffer 43. The microprocessor 31 previously prepares the correction table having the relationship between the digital value (i.e., the actual voltage at the point C) and the command value to the switch 36 (i.e., the corresponding voltage at the point D), and this correction table is stored in the RAM 44.

After above step, the microprocessor 31 supplies the digital command value as a target value to the D/A convertor 32, and determines a correction command HDAC corresponding to the command value with reference to the correction table. The correction command HDAC corresponds to an error to be corrected as explained below.

Further, the D/A converter 41 converts the correction command HDAC into the analog value, and this analog value is supplied to the inverted terminal of the operational amplifier 37 through the resistor 14. Accordingly, it is possible to correct the voltage at the point C so as to become an equal voltage at the point D in the absolute value. Accordingly, it is possible to supply the current to the motor 39 in accordance with a command from the microprocessor 31 regardless of the dispersion of the value of the resistors R11, R12 and R13.

Briefly, as explained above, the digital command value is previously determined from the relationship between the radius of the tape and the supply current, and stored in the conversion table. Further, the relationship between the digital command value and the actual value is previously stored in the correction table. Accordingly, the digital command value is generated from the microprocessor with reference to the conversion table, and the error between the digital command value and the actual value is corrected with reference to the correction table.

Figure 5:
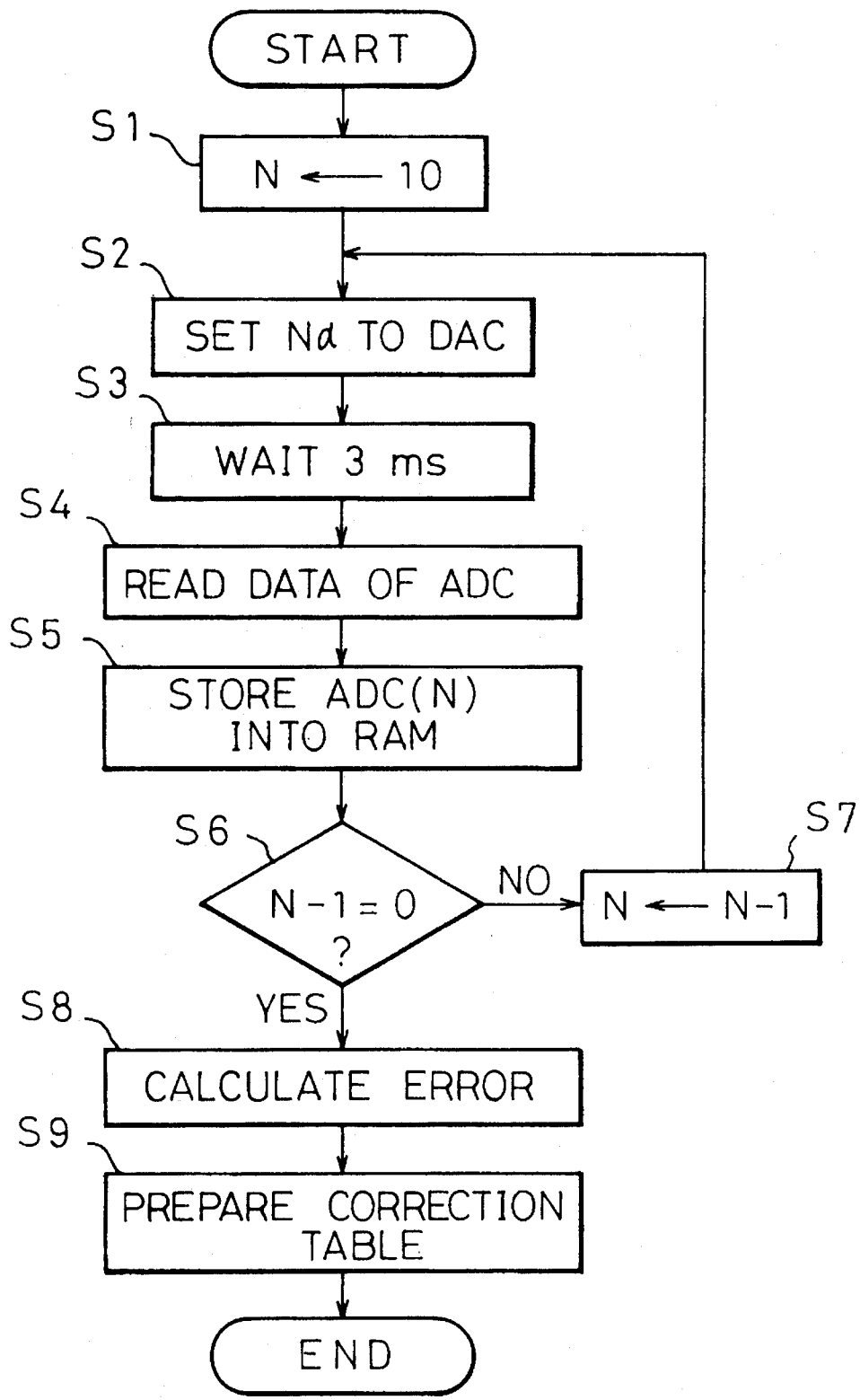
FIG. 5 is a flowchart preparing a correction table.

FIG. 5 is a flowchart preparing the correction table. This flowchart is performed when the power of the current supply circuit is turned ON, or when the self-diagnosis operation is performed under the control of the microprocessor 31.

The motor is locked during the process preparing the correction table, i.e., the rotation of the motor is stopped. In general, a brushless motor is used as the reel-drive motor, and this brushless motor has Hall-elements each provided for corresponding phase winding. Accordingly, the motor can be locked by stopping the switching operation for the input of the Hall-element.

The steps for preparing the correction table are explained in detail below.

In step S1, the loop-counting number N is set to "10" so that loop from the steps S2 to S7 is repeated 10 times.

In step S2, the digital command value from the microprocessor 31 is set to "Nα". In this case, the coefficient α is previously set to slightly smaller value than the value of 1/10 of the maximum command value. The actual current corresponding to the command value Nα is supplied to the motor 39 through the filter, the switch, the operational amplifier, and the power amplifier. Accordingly, the voltage across the resistor R12 is detected and the feedback control is performed from the resistor R12 to the operational amplifier 40.

In step S3, after step S2, the wait time of about 3 m-sec is necessary for the next process, because a predetermined wait time is necessary for convergence of the supply current to the motor 39 in the feedback control operation.

In step 4, the voltage at point C is converted to the digital value by the A/D convertor 42, and this digital value ADC is input to the microprocessor 31.

In step 5, the microprocessor 31 stores the digital value into the RAM 44 as an actual value ADC (N).

In step 6, the microprocessor determines whether or not the counting number N−1 is "0", and when the counting number N−1 is not "0", the process moves to step 7, and when the counting number N−1 is "0", the process moves to step 8.

In step 7, the loop-counting number N is decreased, and the process is returned to the step S2 so that the steps S2 to S7 is repeated until the counting number N−1 becomes "0".

In step 8, the microprocessor 31 calculates each error in accordance with the actual value ADC (N) stored in the RAM 44 and the digital command value Nα (N=from 10 to 1) corresponding to the actual value ADC (N).

In step 9, the microprocessor 31 stores each error corresponding to the counting number N (=from 10 to 1) into the RAM 44 as the correction table.

Figure 6:
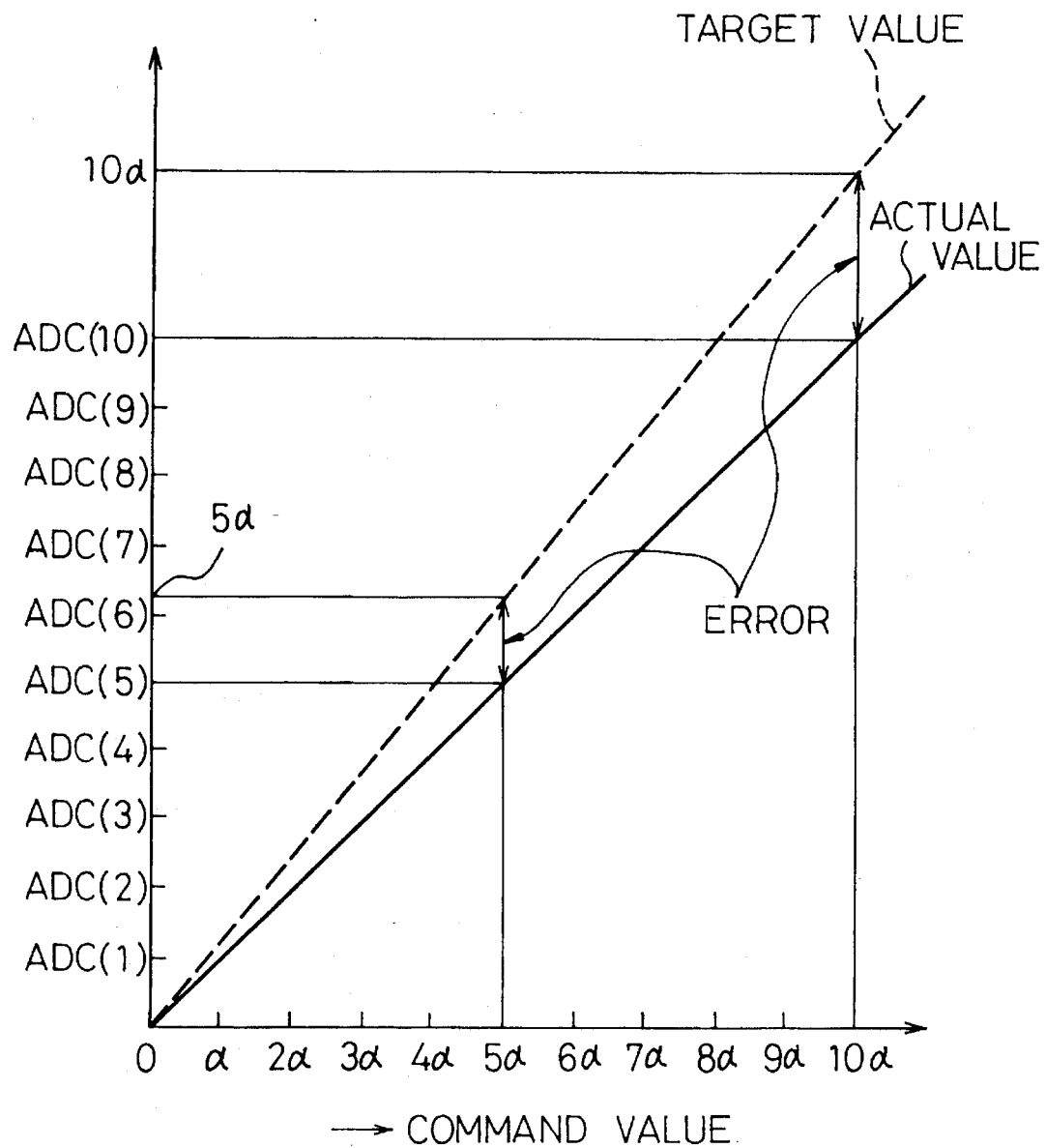
FIG. 6 is a graph explaining an error between a target value (i.e., command value) and an actual value.

FIG. 6 is a graph explaining the error between the target value and the actual value, and FIG. 7 shows a correction table according to the present invention. In FIG. 6, the ordinate denotes the actual value ADC(N) and the target value (i.e., digital command value), and the abscissa denotes the digital command value. Further, the dotted line denotes the target value, and the solid line denotes the actual value. As is obvious, the error is provided by the difference between the target value and the actual value.

In FIG. 7, each actual value ADC(N) is the value at each command value so that the each error (i.e., correction value) is determined by the difference between the command value and the actual value as shown in the table.

As explained above, the supply current to the motor is detected, and the voltage corresponding to the supply current is fed-back to the microprocessor to prepare the correction table. The supply current is controlled by the microprocessor based on the correction table.

FIG. 8 shows one example of a conversion table between the radius of a tape and the supply current to the motor. As explained above, the relationship between the radius of the tape and the supply current is obtained form the formula (1) to (7), and this relationship is stored in the memory (RAM) 44 as the conversion table 1a (see, FIG. 2). That is, as is obvious from the conversion table, it is possible to easily obtain the relationship among the radius of the tape, the supply current and the digital command of the D/A convertor 32.

For example, when the radius R of the tape is 2.5 cm, the supply current $I_m$ to the motor is obtained from the formula (5) as explained above. Accordingly, the digital value to the D/A convertor 32 is obtained as "57" based on the formula (7).

FIG. 9 is a view explaining the rotation of the supply reel and the take-up reel. The rotation detector is provided for the supply reel and the take-up reel. The rotation detector of the supply reel has N-pieces slits, and the rotation detector of the take-up reel has only one slit. As is known, the rotation speed of each reel is detected by the number of the slit which the light is turned ON/OFF.

I claim:

1. A current supply circuit for supplying a current to a reel-drive motor in a magnetic tape apparatus, comprising:

a conversion table storing a digital command representing a relationship between a radius of the magnetic tape wound on a reel and a target current to be supplied to the reel-drive motor, and the target current being converted to a digital command;

a correction table storing a digital correction value representing a relationship between the digital command and an actual current flowing in the motor when the digital command is applied to the motor, the actual current being converted to a digital value;

command means for outputting the digital command corresponding to the target current in accordance with the conversion table;

supply current control means for supplying an analog current converted from the digital command to the motor;

first correction means for applying a first correction signal to the supply current control means in response to the actual current flowing in the motor; and second correction means for supplying, separately from the first correction signal, a second correction signal to the supply current control means in accordance with the digital correction value stored in the correction table, the digital correction value corresponding to the digital command being applied to the current control means.

2. A current supply circuit for supplying a current to a reel-drive motor in a magnetic tape apparatus, comprising:

a conversion table storing a relationship between a radius of the magnetic tape wound on a reel and a target current to be supplied to the reel-drive motor, and the target current being converted to a digital command;

a correction table storing a relationship between the digital command and an actual current flowing in the motor when the digital command is applied to the motor, the actual current being converted to a digital value;

a command means for outputting the digital command corresponding to the target current in accordance with the conversion table;

a supply current control means for supplying an analog current converted from the digital command to the motor comprising an operational amplifier of which a non-inverted terminal is connected to a ground and an inverted terminal is connected to a first resistor and a second resistor, the first correction signal being input to the inverted terminal through the first resistor, and an output of the command means being connected to the inverted terminal through the second resistor;

a first correction means for applying a first correction signal to the supply current control means in response to the actual current flowing in the motor; and a second correction means for supplying a second correction signal to the supply current control means in accordance with an error to be corrected from the correction table, using the value of the digital command.

3. A current supply circuit as claimed in claim 2, wherein said supply current control means further comprising two filter means connected to the first resistor through a switch means that switches between two filters, one filter being a low-pass filter for a speed control provided to cut-off a predetermined frequency, and the other filter being a differential filter for position control provided to detect a tape run/stop state.

4. A current supply circuit as claimed in claim 2 wherein said supply current control means further comprises two filter means connected to the first resistor through a switch means that switches between two filters, one filter being a low-pass filter for a speed control provided to cut-off a predetermined frequency, and the other filter being a differential filter for position control provided to detect the tape run/stop state.

5. A control method for a supply current to a reel-drive motor in a magnetic tape apparatus, the step comprising:

previously provided a conversion table storing a digital command representing a relationship between a radius of the magnetic tape wound on a reel and a target current to be supplied to the reel-drive motor, and the target current being converted to a digital command;

providing a correction table storing a digital correction value representing a relationship between the digital command and an actual current flowing in the motor when the digital command is applied to the motor, the actual current being converted to a digital value;

outputting the digital command corresponding to the target current from a command means in accordance with the conversion table;

supplying an analog current corresponding to the digital command from a supply current control means to the motor;

applying a first correction signal from a first correction means to the supply current control means in response to the actual current flowing in the motor; and supplying, separately from the first correction signal, a second correction signal from a second correction means to the supply current control means in accordance with the digital correction value stored in the correction table, the digital correction value corresponding to the digital command being applied to the current control means.

6. A magnetic tape apparatus comprising:

two reel-drive motors for a supply and take-up reels;

a head guide having a magnetic head and two roller guides for transferring the magnetic tape from the supply reel to the take-up reel, and not having a mechanical tension sensor to provide a tape tension for the magnetic tape;

a magnetic tape drive unit for driving the reel-drive motors; and a magnetic tape drive control unit having means for controlling a supply current to the magnetic tape drive unit to control the tape tension through a torque of each reel-drive motor said means for controlling a supply current including, a conversion table storing a digital command representing a relationship between a radius of the magnetic tape wound on said take-up reel and a target current to be supplied to the reel-drive motor, and the target current being converted to a digital command;

a correction table storing a digital correction value representing a relationship between the digital command and an actual current flowing in the motor when the digital command is applied to the motor, the actual current being converted to a digital value;

command means for outputting the digital command corresponding to the target current in accordance with the conversion table;

supply current control means for supplying an analog current converted from the digital command to the motor;

first correction means for applying a first correction signal to the supply current control means in response to the actual current flowing in the motor; and second correction means for supplying, separately from the first correction signal, a second correction signal to the supply current control means in accordance with the digital correction value stored in the correction table, the digital correction value corresponding to the digital command being applied to the current control means.

7. A current supply circuit for supplying a current to a motor in a magnetic recording apparatus, comprising:

means for outputting a digital command corresponding to a target current to be supplied to the motor;

supply current control means for supplying an analog current converted from the digital command to the motor;

a correction table storing a digital correction value representing a relationship between the digital command and an actual current flowing in the motor when the digital command is output to the supply current control means;

first correction means for applying a first correction signal to the supply current control means in response to an actual current flowing in the motor; and second correction means for supplying, separately from the first correction signal, a second correction signal to the supply current control means in accordance with the digital correction value stored in the correction table, the digital correction value corresponding to the digital command being applied to the current control means.

8. A current supply circuit as claimed in claim 7, wherein said supply current control means comprises an operational amplifier of which a non-inverted terminal is connected to a ground and an inverted terminal is connected to a first resistor and a second resistor, the first correction signal being input to the inverter terminal through the first resistor and an output command means being connected to the inverted terminal through the second resistor.

9. A current supply circuit for supplying a current to a motor in a magnetic recording apparatus, comprising:

a central processing unit which outputs a digital command corresponding to a target current to be supplied to the motor;

a D/A converter which converts the digital command to an analog current;

a first operational amplifier having an input terminal, the analog current from the D/A converter being input to the input terminal of the first operational amplifier, the first operational amplifier outputting an analog current to the motor;

a detector which detects an actual current flowing in the motor, and which outputs a detecting signal;

means for outputting a first correction signal to the input terminal of the first operational amplifier in response to the detecting signal output from the detector;

a correction table storing a digital correction value representing a relationship between the digital command and an actual current flowing in the motor when the digital command is output to the D/A converter; and means for outputting a second correction signal to the input terminal of the first operational amplifier in accordance with the digital correction value stored in the correction table, the digital correction value corresponding to the digital command being applied to the current control means.

10. A magnetic tape apparatus comprising:

two reel-drive motors for a supply and take-up reels;

a head guide having a magnetic head and two roller guides for transferring the magnetic tape from the supply reel to the take-up reel, and not having a mechanical tension sensor to provide a tape tension for the magnetic tape;

a magnetic tape drive unit for driving the reel-drive motors; and a magnetic tape drive control unit having means for controlling a supply current to the magnetic tape drive unit to control the tape tension through a torque of each reel-drive motor said means for controlling a supply current including, means for outputting a digital command corresponding to a target current to be supplied to the motor;

supply current control means for supplying an analog current converted from the digital command to the motor;

a correction table storing a digital correction value representing a relationship between the digital command and an actual current flowing in the motor when the digital command is output to the supply current control means;

first correction means for applying a first correction signal to the supply current control means in response to an actual current flowing in the motor; and second correction means for supplying, separately from the first correction signal, a second correction signal to the supply current control means in accordance with the digital correction value stored in the correction table, the digital correction value corresponding to the digital command being applied to the current control means.

11. A current supply circuit as claimed in claim 10, wherein said supply current control means comprises an operational amplifier of which a non-inverted terminal is connected to a ground and an inverted terminal is connected to a first resistor and a second resistor, the first correction signal being input to the inverter terminal through the first resistor and an output command means being connected to the inverted terminal through the second resistor.

12. A magnetic tape apparatus comprising:

two reel-drive motors for a supply and take-up reels;

a head guide having a magnetic head and two roller guides for transferring the magnetic tape from the supply reel to the take-up reel, and not having a mechanical tension sensor to provide a tape tension for the magnetic tape;

a magnetic tape drive unit for driving the reel-drive motors; and a magnetic tape drive control unit having means for controlling a supply current to the magnetic tape drive unit to control the tape tension through a torque of each reel-drive motor said means for controlling a supply current including:

a central processing unit which outputs a digital command corresponding to a target current to be supplied to the motor;

a D/A converter which converts the digital command to an analog current;

a first operational amplifier having an input terminal, the analog current from the D/A converter being input to the input terminal of the first operational amplifier, the first operational amplifier outputting an analog current to the motor;

a detector which detects an actual current flowing in the motor, and which outputs a detecting signal;

means for outputting a first correction signal to the input terminal of the first operational amplifier in response to the detecting signal output from the detector;

a correction table storing a digital correction value representing a relationship between the digital command and an actual current flowing in the motor when the digital command is output to the D/A converter; and means for outputting a second correction signal to the input terminal of the first operational amplifier in accordance with the digital correction value stored in the correction table, the digital correction value corresponding to the digital command being applied to the current control means.

* * * * *

UNITED STATES PATENT AND TRADEMARK OFFICE
CERTIFICATE OF CORRECTION

PATENT NO. : 5,465,918
DATED : November 14, 1995
INVENTOR(S) : Watanabe

Page 1 of 2

It is certified that error appears in the above-indentified patent and that said Letters Patent is hereby corrected as shown below:

Column 2, line 33, after "flowing" insert --to--.

Column 2, line 62, delete "10".

Column 6, line 2, after "motor," insert --40.--.

Column 6, line 47, delete "bits" and insert --8 bit--.

Column 6, line 54, delete "the" and insert --this--.

Column 7, line 13, delete "contant" and insert --constant--.

Column 7, line 41, delete "two resistor" and insert --two resistors--.

UNITED STATES PATENT AND TRADEMARK OFFICE
CERTIFICATE OF CORRECTION

PATENT NO. : 5,465,918
DATED : November 14, 1995
INVENTOR(S) : Watanabe

Page 2 of 2

It is certified that error appears in the above-indentified patent and that said Letters Patent is hereby corrected as shown below:

Column 7, line 60, start new paragraph after "stop state.".

Column 9, line 53, delete "the".

Column 11, line 10, delete "2" and insert --1--.

Signed and Sealed this

Twenty-ninth Day of April, 1997

Attest:

BRUCE LEHMAN

*Attesting Officer*    *Commissioner of Patents and Trademarks*